(12) United States Patent
Walster et al.

(10) Patent No.: US 6,950,844 B2
(45) Date of Patent: Sep. 27, 2005

(54) METHOD AND APPARATUS FOR SOLVING SYSTEMS OF LINEAR INEQUALITIES

(75) Inventors: G. William Walster, Cupertino, CA (US); Eldon R. Hansen, Los Altos, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 569 days.

(21) Appl. No.: 10/095,155

(22) Filed: Mar. 11, 2002

(65) Prior Publication Data

US 2003/0172099 A1 Sep. 11, 2003

(51) Int. Cl.[7] .............................................. G06F 7/38
(52) U.S. Cl. ...................................................... 708/446
(58) Field of Search ......................................... 708/446

(56) References Cited

U.S. PATENT DOCUMENTS

| | | | | |
|---|---|---|---|---|
| 5,136,538 A | * | 8/1992 | Karmarkar et al. | 708/607 |
| 5,717,621 A | * | 2/1998 | Gupta et al. | 708/446 |
| 5,872,952 A | * | 2/1999 | Tuan et al. | 703/14 |
| 6,078,938 A | * | 6/2000 | Pan et al. | 708/500 |

OTHER PUBLICATIONS

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63–78 http://interval.louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385–392. http://interval.louisiana.edu/preprints.html.

R. B. Kearfott and M. Novoa III, "Algorithm 681: INTBIS, A portable interval Newton/bisection package", ACM Trans. Math Software, vol. 16, No. 2, pp. 152–147. http://www.netlib.org/toms/681.

(Continued)

*Primary Examiner*—Tan V. Mai
(74) *Attorney, Agent, or Firm*—Park, Vaughan & Fleming, LLP

(57) ABSTRACT

One embodiment of the present invention provides a system that performs a procedure to solve a system of linear inequalities. During operation, the system receives a representation of the system of linear inequalities $Ax \leq b$, wherein $Ax \leq b$ can be a linearized form of a system of nonlinear equations. Within this representation, A is an interval matrix with m rows corresponding to m inequalities, and with n columns corresponding to n variables, the vector x includes n variable components, and the vector b includes m scalar interval components. The system solves the system of linear inequalities $Ax \leq b$ by performing a Gaussian elimination process using only positive multipliers so as not to change the sense of any inequality. For a given column j in A, performing the Gaussian elimination process involves attempting to select a primary pivot row r including a primary pivot element, $a_{rj}$, which does not contain zero, and attempting to select a secondary pivot row s including a secondary pivot element, $a_{sj}$, which does not contain zero and is opposite in sign to $a_{rj}$. If r and s are successfully selected, the system uses the secondary pivot element $a_{sj}$ to zero elements opposite in sign to it in the same column of A, except for the primary pivot element $a_{rj}$. The system also adds a copy s' of the secondary pivot row s to the matrix A, thereby increasing the number of rows in the matrix A. Next, the system uses the primary pivot element are to zero elements opposite in sign to it in the same column of A, except for the copy of the secondary pivot element $a_{s'j}$ in row s'.

9 Claims, 10 Drawing Sheets

OTHER PUBLICATIONS

R. B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447–458.

R. B. Kearfott and G.W. Walster, "On Stopping Criteria in Verfied Nonlinear Systems or Optimization Algorithms," ACM Trans. Math. Software, 26, vol. 3, Sep. 2000, pp. 323–351. The publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051–1065.

A. Neumaier, "The Enclosure of Solutions of Parameter-Dependent Systems of Euqations," Cambridge University Press, Cambridge, 1990, ISBN: 0–12–505630–3, Reliability in Computing pp. 269–286.

S.M. Rump, "Verification Methods for Dense and Sparse Systems of Equations," in Topics in Validated Computations: Proceedings of the IMACS–GAMM International Workshop on Validated Computations, University of Oldenburg, J. Herzberger, ed., Elsevier Studies in Computational Mathematics, Elsevier, 1994, pp. 63–136.

Pascal Van Hentenryck, Vijay Saraswat and Yves Deville, "Design, Implementation, and Evaluation of the Constraint Language cc (FD)," Elsevier Science, Inc., 1998.

* cited by examiner $$X \equiv [\underline{x}, \bar{x}] \equiv \{x \in \mathfrak{R}^* | \underline{x} \leq x \leq \bar{x}\}$$

$$Y \equiv [\underline{y}, \bar{y}] \equiv \{y \in \mathfrak{R}^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, if $0 \notin Y$ $X/Y \subseteq \mathfrak{R}^*$, if $0 \in Y$

FIG. 5

METHOD AND APPARATUS FOR SOLVING SYSTEMS OF LINEAR INEQUALITIES

RELATED APPLICATION

The subject matter of this application is related to the subject matter in a co-pending non-provisional application by the same inventors as the instant application entitled, "Method and Apparatus for Solving an Inequality Constrained Global Optimization Problem", having Ser. No. 10/042,883, and filing date 8 Jan. 2002.

BACKGROUND

1. Field of the Invention

The present invention relates to performing arithmetic operations within a computer system. More specifically, the present invention relates to a method and an apparatus for efficiently solving a system of linear inequalities within a computer system.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a,b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to perform inequality constrained global optimization to find a global minimum of a nonlinear objective function $f(x)$, subject to nonlinear inequality constraints of the form $p_i(x) \leq 0$ (i=1, . . . , m). This can be accomplished using any members of a set of criteria to delete boxes, or parts of boxes that either fail to satisfy one or more inequality constraints, or cannot contain the global minimum $f^*$ given the inequality constraints are all satisfied. The set of criteria includes:

(1) the $f\_$bar-criterion, wherein if $f\_$bar is the smallest upper bound so far computed on $f$ within the feasible region defined by the inequality constraints, then any point x for which $f(x) > f\_$bar can be deleted. Similarly, any box X can be deleted if $\inf(f(X)) > f\_$bar;

(2) the monotonicity criterion, wherein if $g(x)$ is the gradient of $f$ evaluated at a strictly feasible point x for which all $p_i(x) < 0$ (i=1, . . . , m), then any such feasible point x for which $g(x) \neq 0$ can be deleted. Similarly, any feasible box X can be deleted if $0 \notin g(X)$;

(3) the convexity criterion, wherein if $H_{ii}(x)$ is the i-th diagonal element of the Hessian of $f$, then any strictly feasible point x for all which all $p_i(x) < 0$ (i=1, . . . , m) and $H_{ii}(x) < 0$ (for i=1, . . . , n) can be deleted. Similarly, any box X in the interior of the feasible region can be deleted if $H_{ii}(X) < 0$ (for i=1, . . . , n); and (4) the stationary point criterion, wherein points x are deleted using the interval Newton technique to solve the John conditions. (The John conditions are described in "Global Optimization Using Interval Analysis" by Eldon R. Hansen, Marcel Dekker, Inc., 1992.)

All of these criteria work best "in the small" when the objective function $f$ is approximately quadratic and "active" constraints are approximately linear. An active constraint is one that is zero at a solution point. For large intervals containing multiple stationary points the above criteria might not succeed in deleting much of a given box. In this case the box is split into two or more sub-boxes, which are then processed independently. By this mechanism all the inequality constrained global minima of a nonlinear objective function can be found.

One problem is applying this procedure to large n-dimensional interval vectors (or boxes) that contain multiple local minima. In this case, the process of splitting in n-dimensions can lead to exponential growth in the number of boxes to process.

It is well known that this problem (and even the problem of computing "sharp" bounds on the range of a function of n-variables over an n-dimensional box) is an "NP-hard" problem. In general, NP-hard problems require an exponentially increasing amount of work to solve as n, the number of independent variables, increases.

Because NP-hardness is a worst-case property and because many practical engineering and scientific problems have relatively simple structure, one problem is to use this simple structure of real problems to improve the efficiency of interval inequality constrained global optimization algorithms.

Hence, what is needed is a method and an apparatus for using the structure of a nonlinear objective function to improve the efficiency of interval inequality constrained global optimization software.

SUMMARY

One embodiment of the present invention provides a system that performs a procedure to solve a system of linear inequalities. This procedure provides a useful sub-procedure in solving an interval inequality constrained global optimization problem. During operation, the system receives a representation of the system of linear inequalities $Ax \leq b$, wherein $Ax \leq b$ can be a linearized form of a system of nonlinear equations. Within this representation, A is an interval matrix with m rows corresponding to m inequalities, and with n columns corresponding to n variables, the vector x includes n variable components, and the vector b includes m scalar interval components. Next, the system stores this representation in a memory within a computer system. The system then solves the system of linear inequalities $Ax \leq b$ by performing a Gaussian elimination process using only positive multipliers so as not to change the sense of any inequality. For a given column j in A, performing the Gaussian elimination process involves attempting to select a primary pivot row r including a primary pivot element, $a_{rj}$, which does not contain zero, and attempting to select a secondary pivot row s including a secondary pivot element, $a_{sj}$, which does not contain zero and is opposite in sign to $a_{rj}$. If r and s are successfully selected, the system uses the secondary pivot element $a_{sj}$ to zero elements opposite in sign to it in the same column of A, except for the primary pivot element $a_{rj}$. The system also adds a copy s' of the secondary pivot row s to the matrix A, thereby increasing the number of rows in the matrix A. Next, the system uses the primary pivot element $a_{rj}$ to zero elements opposite in sign to it in the same column of A, except for the copy of the secondary pivot element $a_{s'j}$ in row s'.

In a variation on this embodiment, receiving the representation of the system of linear inequalities $Ax \leq b$ involves: receiving a system of linear inequalities with interval coefficients $A^I x \leq b^I$; forming an initial matrix A as the center of the interval matrix $A^I$; and forming an initial matrix b as the center of the interval matrix $b^I$.

In a variation on this embodiment, the system also generates a preconditioning matrix B by starting with an initial identity matrix B of order m, and performing the same operations on B as are performed on the matrix A during the Gaussian elimination process.

In a variation on this embodiment, the system uses the preconditioning matrix B to precondition the system of linear inequalities $A^I x \leq b^I$ to generate a modified system $BA^I x \leq Bb^I$ that can be solved with reduced interval width.

In a variation on this embodiment, receiving the system of linear inequalities with interval coefficients $A^I x \leq b^I$ involves linearizing an initial system of nonlinear inequalities to form the system of linear inequalities with interval coefficients $A^I x \leq b^I$.

In a variation on this embodiment, performing the Gaussian elimination process involves performing column interchanges in the system of linear equalities $Ax \leq b$.

In a variation on this embodiment, selecting the secondary pivot row s involves ensuring that the secondary pivot element $a_{sj}$ is as high as possible in its column. (Note that one embodiment of the system orders the system of linear inequalities with respect to how seriously corresponding nonlinear inequalities are violated.)

In a variation on this embodiment, selecting the secondary pivot row s involves ensuring that the secondary pivot element $a_{sj}$, is as large in magnitude as possible.

In a variation on this embodiment, selecting the primary pivot row r involves ensuring that the primary pivot element $a_{rj}$ is as large in magnitude as possible.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
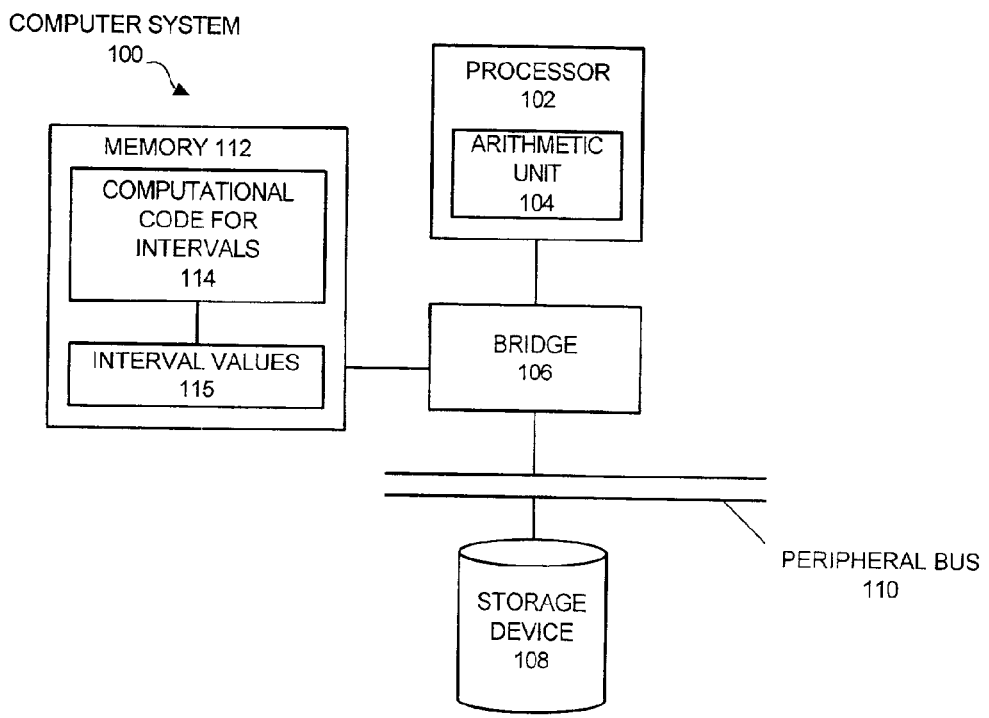
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
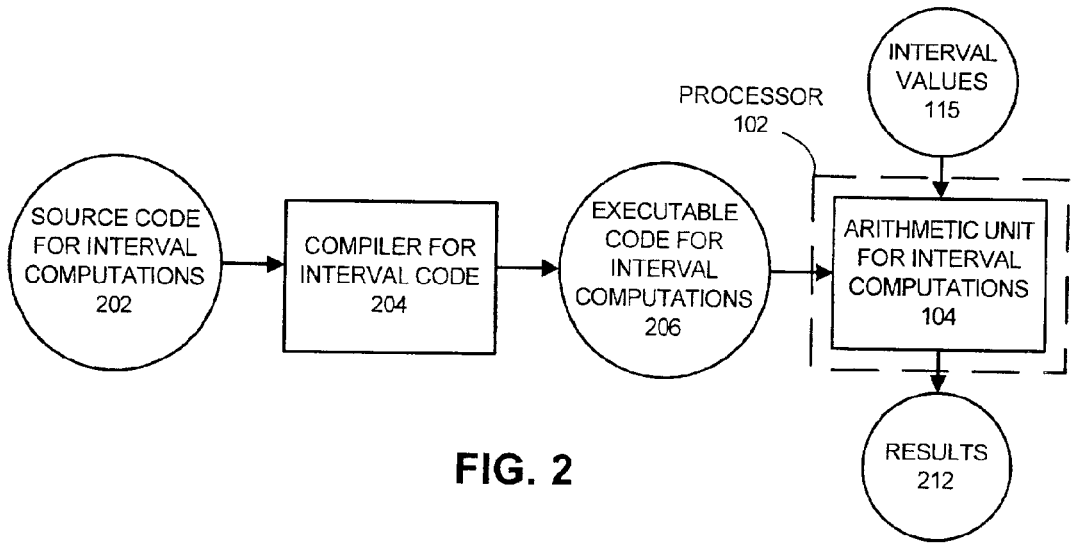
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
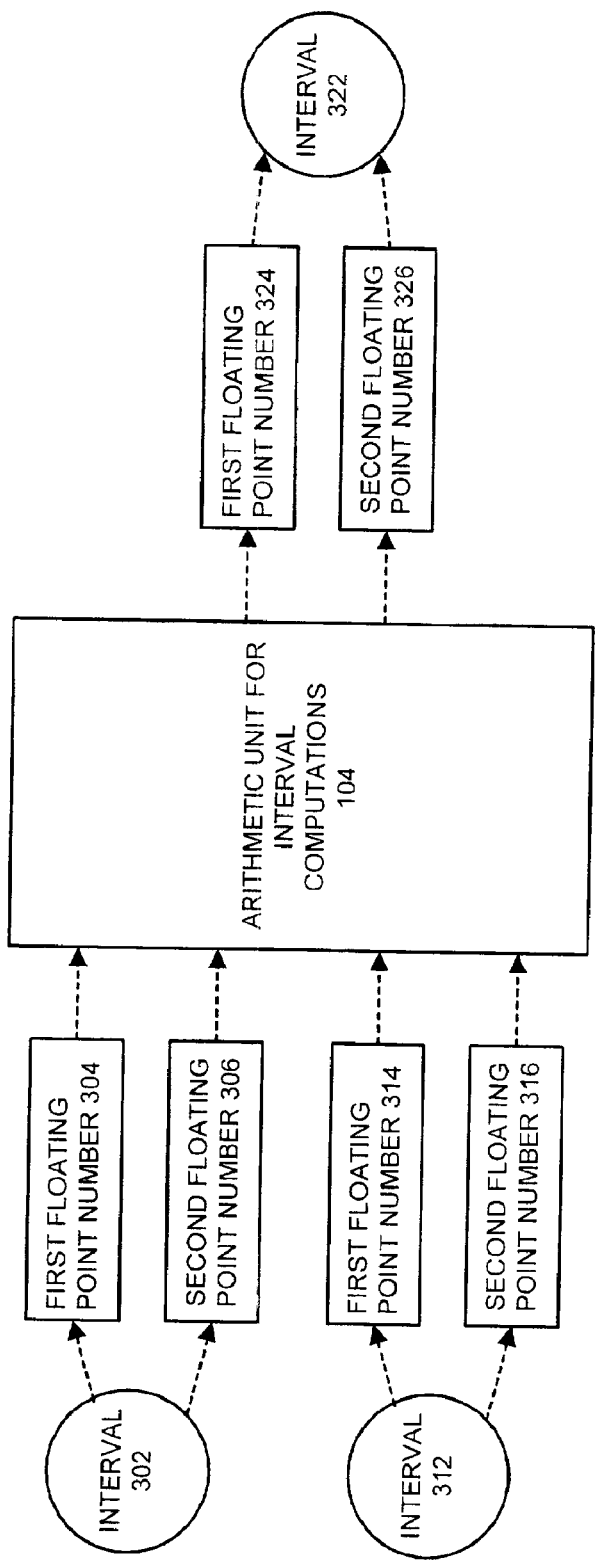
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
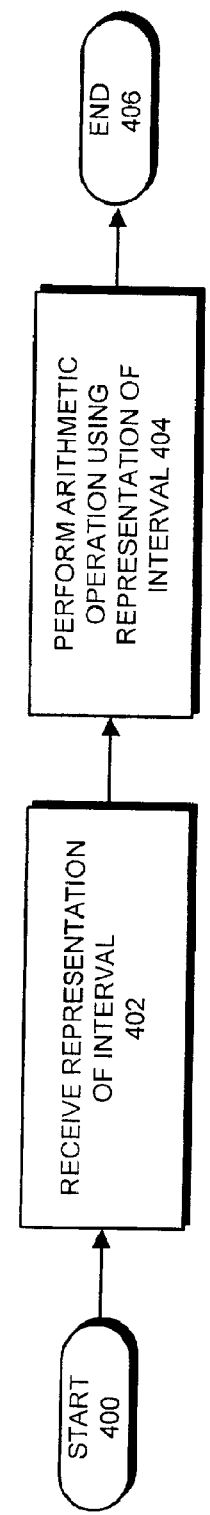
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x,x]. Also note that the left endpoint of an interior interval is always less than or equal to the right endpoint. The set of extended real numbers, R* is the set of real numbers, R, extended with the two ideal points negative infinity and positive infinity:

$R^* = R \cup \{-\infty\} \cup \{+\infty\}$.

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Term Consistency

Figure 6:
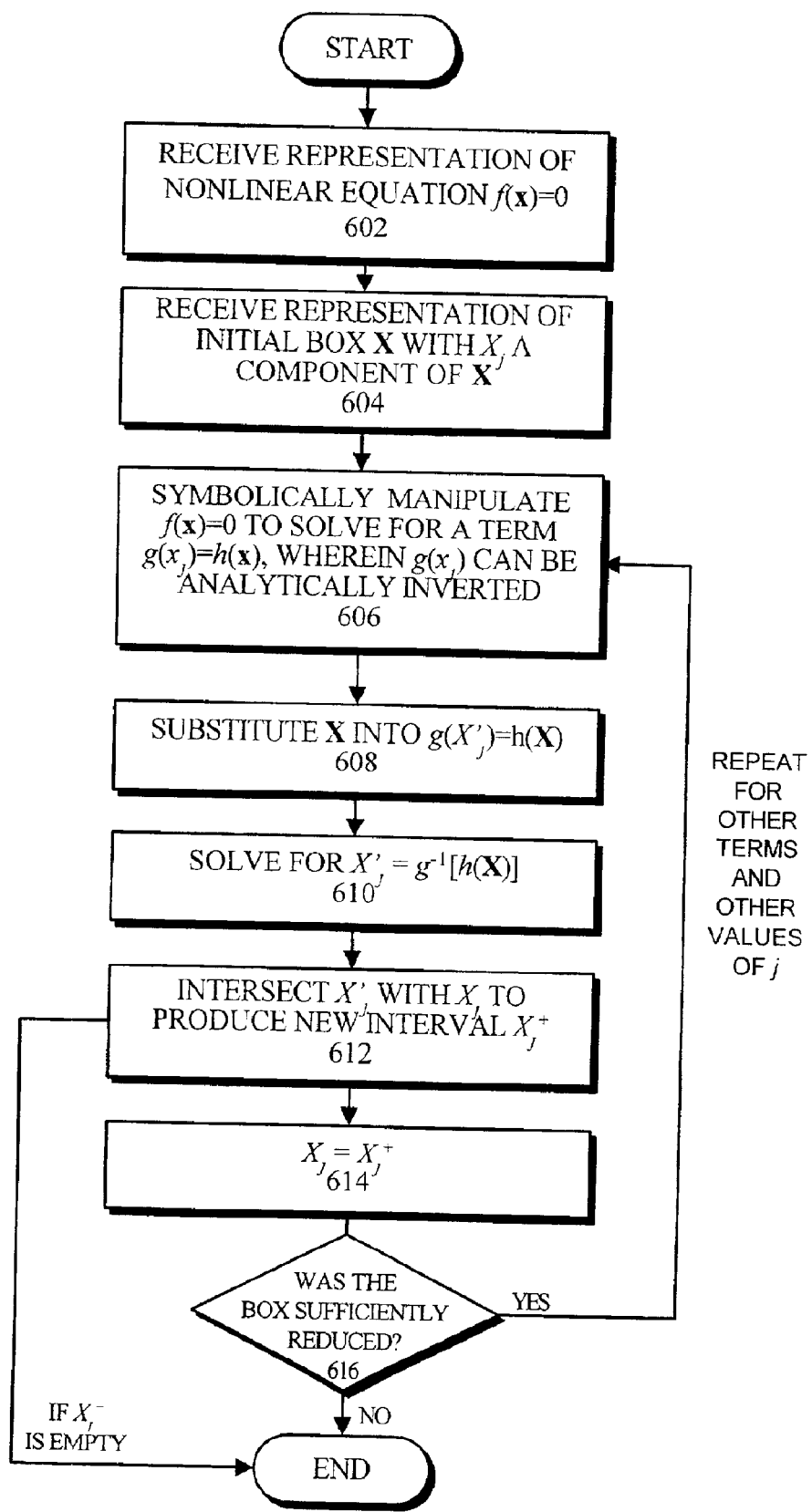
FIG. 6 is a flow chart illustrating the process of finding an interval solution to a nonlinear equation in accordance with an embodiment of the present invention.

FIG. 6 is a flow chart illustrating the process of solving a nonlinear equation through interval arithmetic and term consistency in accordance with an embodiment of the present invention. The system starts by receiving a representation of a nonlinear equation $f(x)=0$ (step 602), as well as a representation of an initial box with X with $X_j$ an element of X (step 604). Next, the system symbolically manipulates the equation $f(x)=0$ into a form $g(x_j)-h(x)=0$, wherein the term $g(x_j)$ can be analytically inverted to produce an inverse function $g^{-1}(y)$ (step 606).

Next, the system substitutes the initial box X into $h(X)$ to produce the equation $g(X'_j)=h(X)$ (step 608). The system then solves for $X'_j=g^{-1}(h(X))$ (step 610). The resulting interval $X'_j$ is then intersected with the initial interval $X_j$ to produce a new interval $X_j^+$ (step 612).

At this point, if $X_j^+$ is empty, the system can terminate. Otherwise, the system can perform further processing. This further processing involves saving $X_j$ by setting $X^{(o)}=X_j$ and also, setting $X_j=X_j^+$ (step 614). Next, if $w(X^{(o)})$ is sufficiently reduced at step 616, the system returns to step 606 for another iteration of term consistency on another term g of $f(x)$. Otherwise, the system terminates the term consistency process.

Examples of Applying Term Consistency

For example, suppose $f(x)=x^2-x+6$. We can define $g(x)=x^2$ and $h(x)=x-6$. Let X=[−10,10]. The procedural step is $(X')^2=X-6=[-16,4]$. Since $(X')^2$ must be non-negative, we replace this interval by [0,4]. Solving for X', we obtain X'=±[0,2]. In replacing the range of h(x) (i.e., [−16,4]) by non-negative values, we have excluded that part of the range h(x) that is not in the domain of $g(x)=x^2$.

Suppose that we reverse the roles of g and h and use the iterative step $h(X')=g(X)$. That is $X'-6=X^2$. We obtain X'=[6,106]. Intersecting this result with the interval [−10,10], of interest, we obtain [6,10]. This interval excludes the set of values for which the range of g(X) is not in the intersection of the domain of h(X) with X.

Combining these results, we conclude that any solution of $f(X)=g(X)-h(X)=0$ that occurs in X=[−10,10] must be in both [−2,2] and [6,10]. Since these intervals are disjoint, there can be no solution in [−10,10].

In practice, if we already reduced the interval from [−10,10] to [−2,2] by solving for g, we use the narrower interval as input when solving for h.

This example illustrates the fact that it can be advantageous to solve a given equation for more than one of its terms. The order in which terms are chosen affects the efficiency. Unfortunately, it is not known how best to choose the best order.

Also note that there can be many choices for g(x). For example, suppose we use term consistency to narrow the interval bound X on a solution of $f(x)=ax^4+bx+c=0$. We can let $g(x)=bx$ and compute $X'=-(aX^4+c)/b$ or we can let $g(x)=ax^4$ and compute $X'=\pm[-(bX+c)/a]^{1/4}$. We can also separate $x^4$ into $x^2 \cdot x^2$ and solve for one of the factors $X'=\pm[-(bX+c)/(aX^2)]^{1/2}$.

In the multidimensional case, we may solve for a term involving more than one variable. We then have a two-stage process. For example, suppose we solve for the term $1/(x+y)$ from the function $f(x,y)=1/(x+y)-h(x,y)=0$. Let $x \in X=[1,2]$ and $y \in Y=[0.5,2]$. Suppose we find that $h(X,Y)=[0.5,1]$. Then $1/(x+y) \in [0.5,1]$ so $x+y \in [1,2]$. Now we replace y by Y=[0.5,2] and obtain the bound [−1,1.5] on X. Intersecting this interval with the given bound X=[1,2] on x, we obtain the new bound X'=[1,1.5].

We can use X' to get a new bound on h; but this may require extensive computing if h is a complicated function; so suppose we do not. Suppose that we do, however, use this bound on our intermediate result x+y=[1,2]. Solving for y as [1,2]−X', we obtain the bound [−0.5,1]. Intersecting this interval with Y, we obtain the new bound Y'=[0.5,1] on y. Thus, we improve the bounds on both x and y by solving for a single term of $f$.

The point of these examples is to show that term consistency can be used in many ways both alone and in combination with the interval Newton algorithm to improve the efficiency with which roots of a single nonlinear equation can be computed. The same is true for systems of nonlinear equations.

Inequality Constrained Interval Global Optimization

FIGS. 7A–7D collectively present a flow chart illustrating the process of solving an interval global optimization problem with inequality constraints in accordance with an embodiment of the present invention. Generally, we seek a solution in a single box specified by the user. However, any number of boxes can be initially specified.

The boxes can be disjoint or overlap. However, if they overlap, a minimum at a point that is common to more than one box is separately found as a solution in each box containing it. In this case, computing effort is wasted. If the user does not specify an initial box or boxes, we use a default box. The process finds the global minimum in the set of points formed by the set of boxes. We assume these initial boxes are placed in a list $L_1$ of boxes to be processed.

Suppose the user of the process knows a point x_bar that is guaranteed to be feasible. If so, we use this point to compute an initial upper bound f_bar on the global minimum $f^*$. If x_bar cannot be represented exactly on the computer, the system forms a representable interval vector X containing x_bar. We evaluate $f(X)$ and obtain [lower bound $f(X)$, upper bound $f(X)$]. Even if rounding and/or dependence are such that X cannot be numerically proven to be certainly feasible, we rely upon the user and assume that X contains a feasible point. Therefore, we set $f\_bar$ equal to the upper bound of $f(X)$.

Also the user may know an upper bound $f\_bar$ on $f^*$ even though he may not know where (or even if) $f$ takes on such a value in the feasible region defined by the inequality constraints. If so, we set $f\_bar$ equal to this known bound. If the known bound is not representable on the computer, the system rounds the value up to a larger value that is representable.

If no feasible point is known and no upper bound on $f^*$ is known, we set $f\_bar+\pm\infty$. The user must specify a box size tolerance $\epsilon_X$ and a function width tolerance $\epsilon_F$.

In the system, nonlinear functions are often linearized over a box X using Taylor expansion. However, use of linearization is generally ineffective if X is wide. Four different sub-procedures in the system use linearization. The system uses a "linearization test" to decide if a given sub-procedure should be used for a given box. Each of the four sub-procedures uses a separate test of the same kind. In each case, a criterion for "success" is defined. The symbol $w_R$ denotes the width of the largest box for which success was achieved. The symbol $w_I$ denotes the width of the smallest box for which success was not achieved. A given sub-procedure is applied for a box X whenever $w(X) \leq (w_R + w_I)/2$. For each sub-procedure, the system initially sets $W_R = 0$ and $w_I = w(X^{(0)})$, where $X^{(0)}$ is the initial box. In addition, the system specifies a bound $f\_bar$ if one is known. Note that the four sub-procedures referred to above are: (1) Newton applied to the gradient; (2) Newton applied to the John conditions; (3) linearization of the constraints; and (4) linearization of $f(x) \leq f\_bar$.

The steps of the process are performed in the order given except as indicated by branching.

First, for each box in the list $L_1$, the system applies term consistency to each of the inequality constraints $p_i(x) \leq 0$ (i=1, ..., m) (step 701).

If $f\_bar < +\infty$, then for each box in $L_1$, the system applies term consistency to the inequality $f \leq f\_bar$ (step 702).

If $L_1$ is empty, the system goes to step 742. Otherwise, the system selects (for the next box X to be processed) the box in $L_1$ for which the lower bound of $f(X)$ is smallest. For later reference, the system denotes this box by $X^{(1)}$. The system also deletes X from $L_1$ (step 703).

The system applies term consistency over X to each constraint inequality. If X is deleted, the system goes to step 703. The system skips this step if X has not changed since step 701. (step 704).

Next, the system computes an approximation x for the center m(X) of X. If the upper bound of $f(x) > f\_bar$, the system goes to step 708 (step 705).

For future reference, the system denotes the box X by $X^{(2)}$. Next, the system does a constrained line search to try to reduce $f\_bar$ (step 706).

If $f\_bar$ was not reduced in step 706, the system goes to step 709 (step 707).

Next, the system applies term consistency to the inequality $f(x) \leq f\_bar$. If X is deleted, the system goes to step 703 (step 708).

If $w(X) < \epsilon_X$ and $w[f(X)] < \epsilon_F$, the system puts X in list $L_2$. Otherwise, if X is sufficiently reduced relative to the box $X^{(1)}$ defined in step 703, the system puts X in $L_1$ and goes to step 703 (step 709). We say that a box X is sufficiently reduced if any component of X is reduced by an amount that is at least a fraction (say 0.25) of the width of the widest component of X.

Next, the system applies box consistency to each inequality constraint. If $f\_bar < +\infty$, the system also applies box consistency to the inequality $f(x) \leq f\_bar$. If X is deleted, the system goes to step 703 (step 710).

If the upper bound of $p_i(X) \geq 0$ for any i=1, ..., n, (i.e., if X is not certainly strictly feasible), the system goes to step 726 (step 711).

Next, the system applies term consistency to $g_i(x) = 0$ for i=1, ..., n, where g is the gradient of the objective function $f$. If the result for any i=1, ..., n is empty, the system goes to step 703 (step 712). Note that the steps 712 through 725 do not use inequality constraints because none are active for the current box X.

Otherwise, the system applies term consistency to the relation $H_{ii}(x) \geq 0$ for i=1, ..., n, where $H_{ii}$ is a diagonal element of the Hessian of $f$. If the result is empty, the system goes to step 703 (step 713).

Next, the system repeats step 709 (step 714).

The system then applies box consistency to $g_i = 0$ for i=1, ..., n. If the result is empty, the system goes to step 703 (step 715).

Next, the system applies box consistency to $H_{ii}(x) \geq 0$ for i=1, ..., n. If the result is empty, the system goes to step 703 (step 716).

Next, the system repeats step 709 (step 717).

The system then uses a criterion $w(X) > (w_I + w_R)/2$ to decide if a Newton step should be applied to solve $g = 0$. If not, the system goes to step 726 (step 718). Note that, $w_I$ denotes the width of the smallest box for which $M^I = BJ(x,X)$ is irregular. If $M^I$ is regular for a given box, $w_R$ denotes the width of the largest box for which $M^I$ has been shown to be regular.

The system generates the interval Jacobian J(x,X) of the gradient g and computes the approximate inverse B of the center of J(x,X). The system also applies one step of an interval Newton method to solve $g = 0$. If the result is empty, the system goes to step 703 (step 719).

Next, the system repeats step 709 (step 720).

The system then uses the matrix B found in step 719 to obtain Bg in analytic form. The system applies term consistency to solve the i-th equation of $Bg = 0$ for the i-th variable $x_i$ for i=1, ..., n. If the result is empty, the system goes to step 703 (step 721).

Next, the system repeats step 709 (step 722).

The system uses box consistency to solve the i-th equation of Bg (as obtained in step 721) for the i-th variable for i=1, ..., n. If the result is empty, the system goes to step 703 (step 723).

Next, the system repeats step 709 (step 724).

The system uses the matrix B found in step 719 in a Newton Step to try to reduce the upper bound $f\_bar$ (step 725). Also note that a line search can be performed using the gradient g but not the matrix B. The line search can be performed as follows. Suppose we evaluate the gradient g(x) of $f(x)$ at a point x. Note that $f$ decreases (locally) in the negative gradient direction from x. A simple procedure for finding a point where $f$ is small is to search along this half-line. Let x be the center of the current box. Define the half-line of points $y(\alpha) = x - \alpha g(x)$ where $\alpha \geq 0$. We now use a standard procedure for finding an approximate minimum of the objective function $f$ on this half-line. We first restrict our region of search by determining the value $\alpha'$ such that $y(\alpha') = x - \alpha' g$ is on the boundary of the current box X, and search between x and x'. We use the following procedure.

Each application of the procedure requires an evaluation of $f$. Procedure: If $f(x')<f(x)$, replace x by $(x+x')/2$. Otherwise, we replace $x'$ by $(x+x')/2$.

Next, the system computes an approximation x for the center $m(X)$ of X. If $f(x)>f\_bar$, the system goes to step 703 (step 726).

The system skips this step and goes to step 732 if $X=X^{(2)}$, the same box for which a line search was done in step 706. Otherwise, the system does a line search to try to reduce $f\_bar$. If $f\_bar$ is not reduced, the system goes to step 732 (step 727).

For future reference, the system denotes X by $X^{(3)}$. The system then uses a linearization test to decide whether to linearize and "solve" the inequality $fA(x) \leq f\_bar$. If this condition is not satisfied, the system goes to step 732 (step 728).

The system uses a linear method to try to reduce X using the inequality $f(x) \leq f\_bar$. If X is deleted, the system goes to step 703. Otherwise, if this application of the linear method does not sufficiently reduce the box $X^{(3)}$, the system goes to step 731 (step 729).

The system uses a quadratic method to try to reduce X using the inequality $f(x) \leq f\_bar$. If X is deleted, the system goes to step 703 (step 730).

Next, the system repeats step 709 (step 731).

The system uses a criterion similar to that in step 718 to decide whether to linearize and "solve" the inequality constraints. If the procedure indicates that the linearization should not be done, the system goes to 739 (step 732).

Next, the system selects the inequality constraints to be solved in linearized form, and possibly adds to this set the inequality $f(x) \leq f\_bar$. Note that the selection process removes from consideration any inequality constraints that are not sufficiently violated. If no inequalities are selected, the system goes to step 739. Otherwise, the system linearizes the resulting set of inequalities, and solves the resulting set of linear inequalities. If the solution set is empty, the system goes to step 703 (step 733).

Next, the system repeats step 709 (step 734).

The system then uses the preconditioning matrix B formed at step 733 to analytically precondition the set of inequalities that were selected for use in step 733. The system also uses term consistency to solve each of the preconditioned inequalities. In so doing, each inequality is solved for the same (single) variable for which the linearized inequality was solved in step 733 (step 735).

Next, the system repeats step 709 (step 736).

The system uses box consistency to solve the same inequalities for the same variables as in step 735 (step 737).

Next, the system repeats step 709 (step 738).

The system uses a linearization test to decide whether to solve the John conditions. If not, the system goes to step 742 (step 739).

The system modifies the John conditions by omitting those constraints $p_i$ for which $p_i(X)<0$ (since they are not active in X). The system applies one pass of the interval Newton method to the (modified) John conditions. If the result is empty, the system goes to step 703 (step 740).

Next, the system repeats step 709 (step 741).

In various previous steps, gaps may have been generated in components of X. If so, the system merges any of these gaps that overlap. The system then splits X, and places the resulting subboxes in $L_I$ and goes to step 703 (step 742).

If $f\_bar<+\infty$, the system applies term consistency to $f(x) \leq f\_bar$ for each box in the list $L_2$. The system denotes those that remain by $X^{(1)}, \ldots, X^{(s)}$ where s is the number of boxes remaining. The system also determines $$\underline{F} = \min_{1 \leq i \leq s} \underline{f}(X^{(i)}) \text{ and } \overline{F} = \max_{1 \leq i \leq s} \overline{f}(X^{(i)}). \qquad \text{(step 743)}$$

Finally, the system terminates (step 744).

After termination, $w(X)<\epsilon_X$ and $w(f(X))<\epsilon_F$ for each remaining box X in the list $L_2$. Also, $$\underline{F} \leq f(x) \leq \overline{F}$$

for every point x in all remaining boxes. If, after termination, $f\_bar<+\infty$, we know there is a feasible point in the initial box(es). Therefore, we know that $$\underline{F} \leq f^* \leq \min\{\overline{f}, \overline{F}\}.$$

If, after termination, $f\_bar=+\infty$, then we have not found a certainly feasible point. There may or may not be one in $X^{(0)}$. However, we know that if a feasible point x does exist in $X^{(0)}$, then $$\underline{F} \leq f(x) \leq \overline{F}.$$

Suppose a feasible point exists. If our algorithm fails to find a certainly feasible point, then it does not produce an upper bound $f\_bar$ and cannot use the relation $f \leq f\_bar$. In particular, it cannot delete local minima where $f(x)>f^*$. In this case, all local minima are contained in the set of output boxes.

If all of the initial box $X^{(0)}$ is deleted by our process, then we have proved that every point in $X^{(0)}$ is infeasible. Suppose that every point in $X^{(0)}$ is infeasible. Our process may prove this to be the case. However, we delete a subbox of $X^{(0)}$ only if it is certainly infeasible. Rounding errors and/or dependence may prevent us from proving certain infeasibility of an infeasible subbox. Increased wordlength can reduce rounding errors and decreasing $\epsilon_X$ can reduce the effect of dependence by causing subboxes to eventually become smaller. However, neither effect can completely be removed.

Suppose $f\_bar=+\infty$ after termination and $X^{(0)}$ has not been entirely eliminated. It may still be possible either to compute $f\_bar<\infty$ or to delete all of $X^{(0)}$ by reducing the values of $\epsilon_X$ and $\epsilon_F$ and continuing to apply the process. To try to do so, we need only to reduce these tolerances and move the boxes from list $L_2$ to list $L_1$. We can then restart the algorithm from the beginning with or without use of increased precision.

Note that steps 712 through 725 are essentially the same as corresponding steps in the process for unconstrained optimization. This is because these steps are applied to a box that is certainly feasible.

In our process, we avoid using more complicated procedures until the simpler ones no longer make sufficient progress in reducing the current box. For example, we delay use of the John conditions until all other procedures become unproductive.

We avoid using procedures that use Taylor expansions until we have evidence that expanded forms provide sufficiently accurate approximations to functions.

Inequality constraints are often simple relations of the form $x_i \leq b_i$ or $x_i \geq a_i$. Such constraints serve to determine the initial box $X^{(0)}$. Therefore, they are satisfied throughout $X^{(0)}$. Such constraints are omitted when applying any procedure designed to eliminate infeasible points. See steps 701, 704, 710 and 733.

In step 706 we use a line search to try to reduce $\bar{f}$. This involves evaluating the gradient of $f$. We can avoid this evaluation by simply checking if the midpoint x of the box is feasible and, if so, using $f(x)$ as a candidate value for $\bar{f}$. However, it helps to have a finite value of $\bar{f}$ early, so the line search is worth doing when $\bar{f}=+\infty$. Step 727 also uses a line search. It is less important here because a finite value of $\bar{f}$ is likely to be computed in step 706. If there are a large number of constraints, then evaluating the gradient is not a dominant part of the work to do the line search.

Experience has shown that efficiency is enhanced if the subbox X to be processed is chosen to be the one for which inf $f(f(X))$ is smallest among all candidate subboxes. This tends to cause a smaller value of $\bar{f}$ to be computed early in the algorithm. Therefore, we return to step 703 to choose a new subbox whenever the current box has substantially changed.

Suppose we find that $p_i(X) \leq 0$ for some value of i and some box X. Then $p_i(X') \leq 0$ for any $X' \subseteq X$. Therefore, we record the fact that $p_i(X) \leq 0$ so that we need not evaluate $p_i(X')$ for any $X' \subseteq X$.

It is possible that the procedures in step 719, 721, 723 or 740 prove the existence of a solution to the optimization problem. If so, the user can be informed of this fact. Such a solution may be local or global.

Solving Systems of Linear Inequalities

Figure 7A:
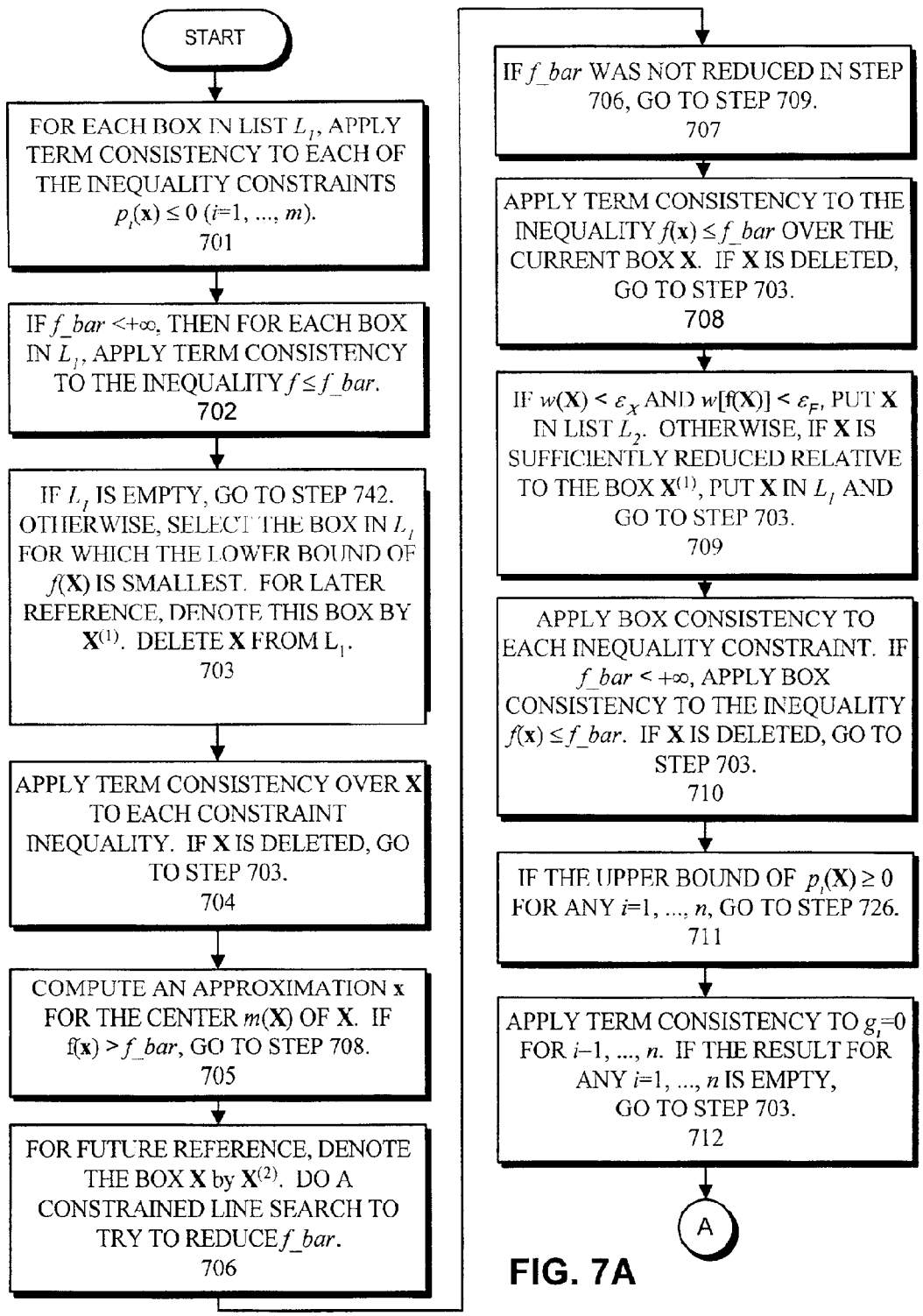
FIG. 7A presents a first portion of a flow chart illustrating the process of using term consistency to solve an interval global optimization problem with inequality constraints in accordance with an embodiment of the present invention.
Figure 7B:
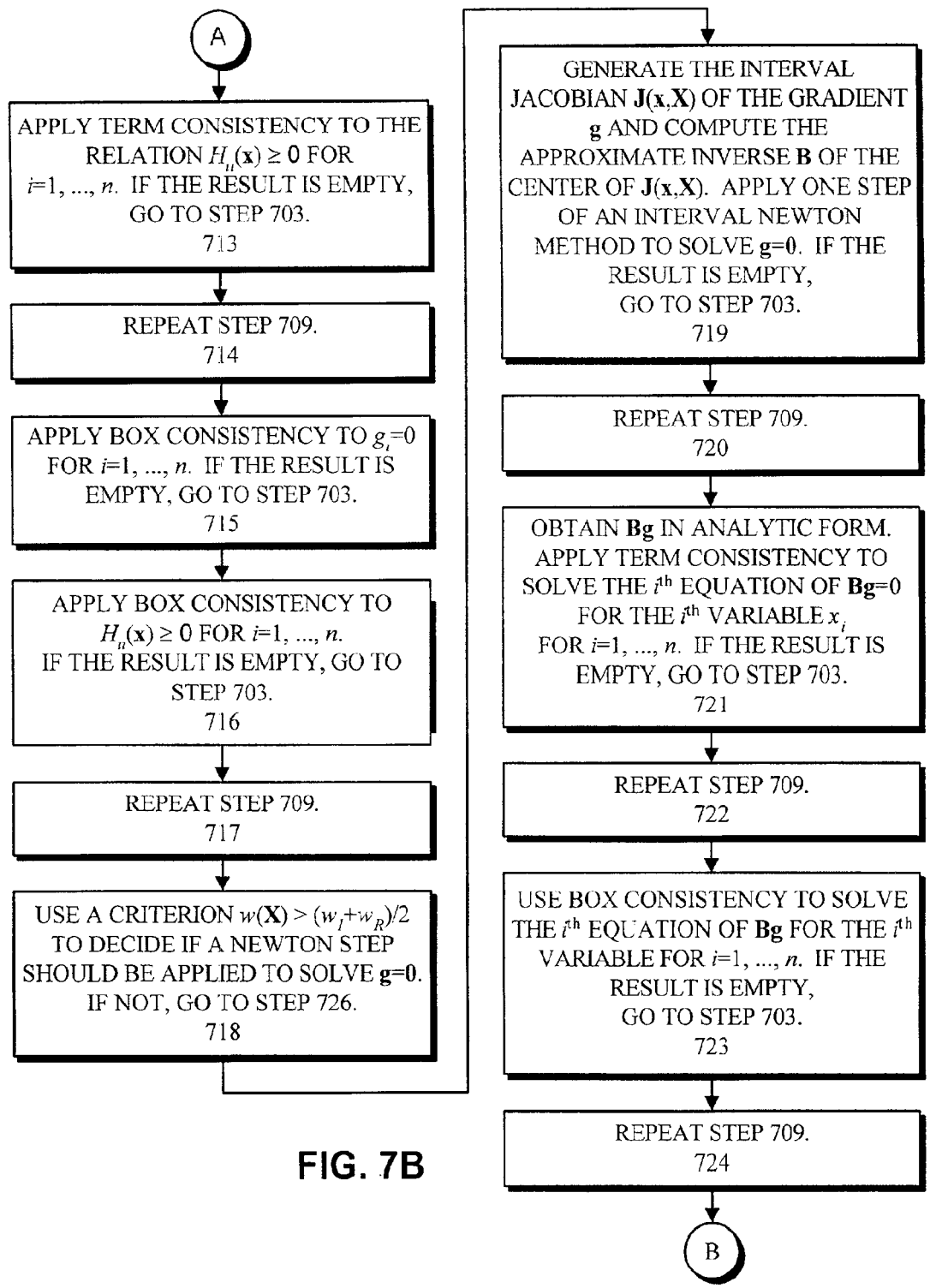
FIG. 7B presents a second portion of a flow chart illustrating the process of using term consistency to solve an interval global optimization problem with inequality constraints in accordance with an embodiment of the present invention.
Figure 7C:
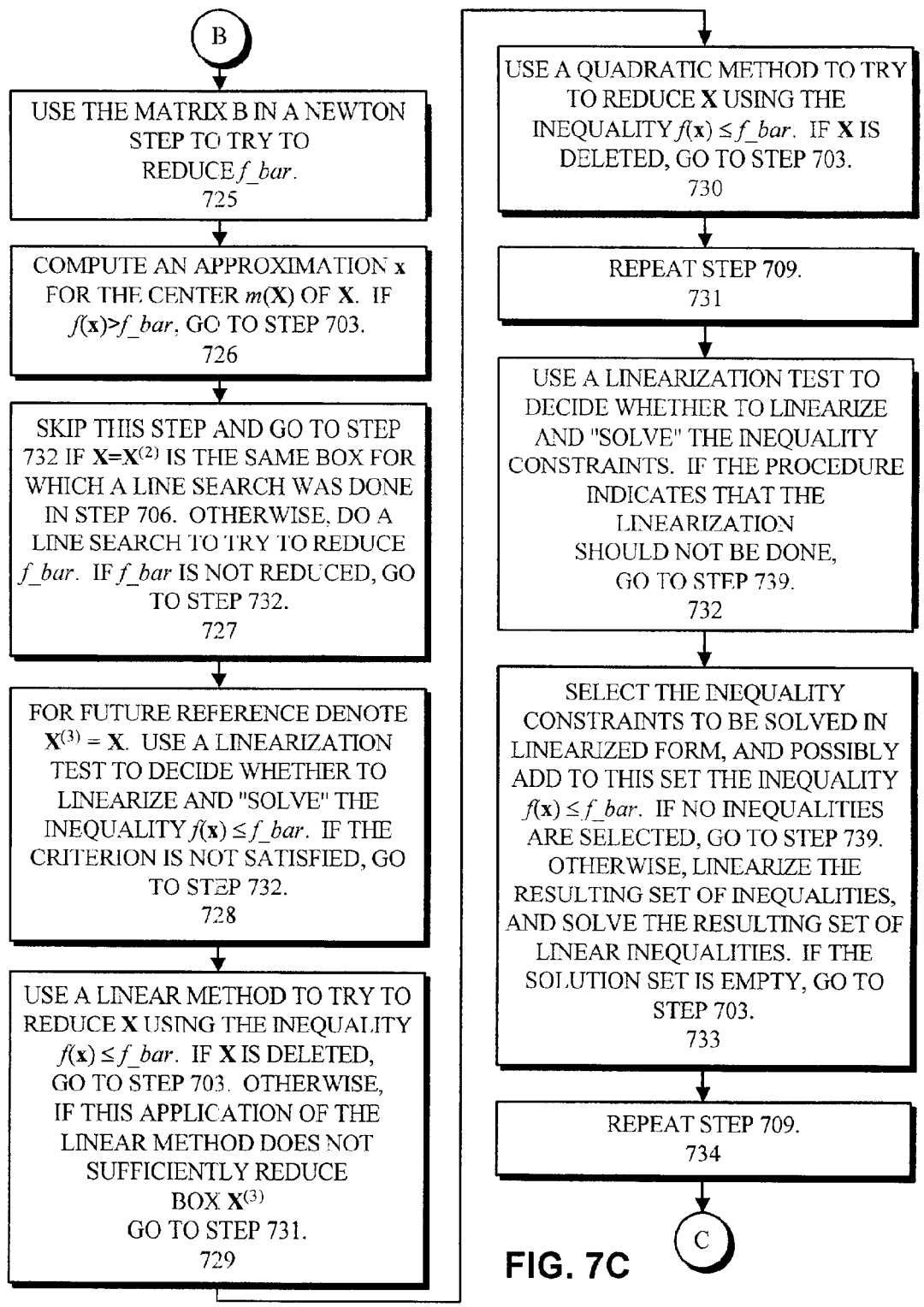
FIG. 7C presents a third portion of a flow chart illustrating the process of using term consistency to solve an interval global optimization problem with inequality constraints in accordance with an embodiment of the present invention.
Figure 7D:
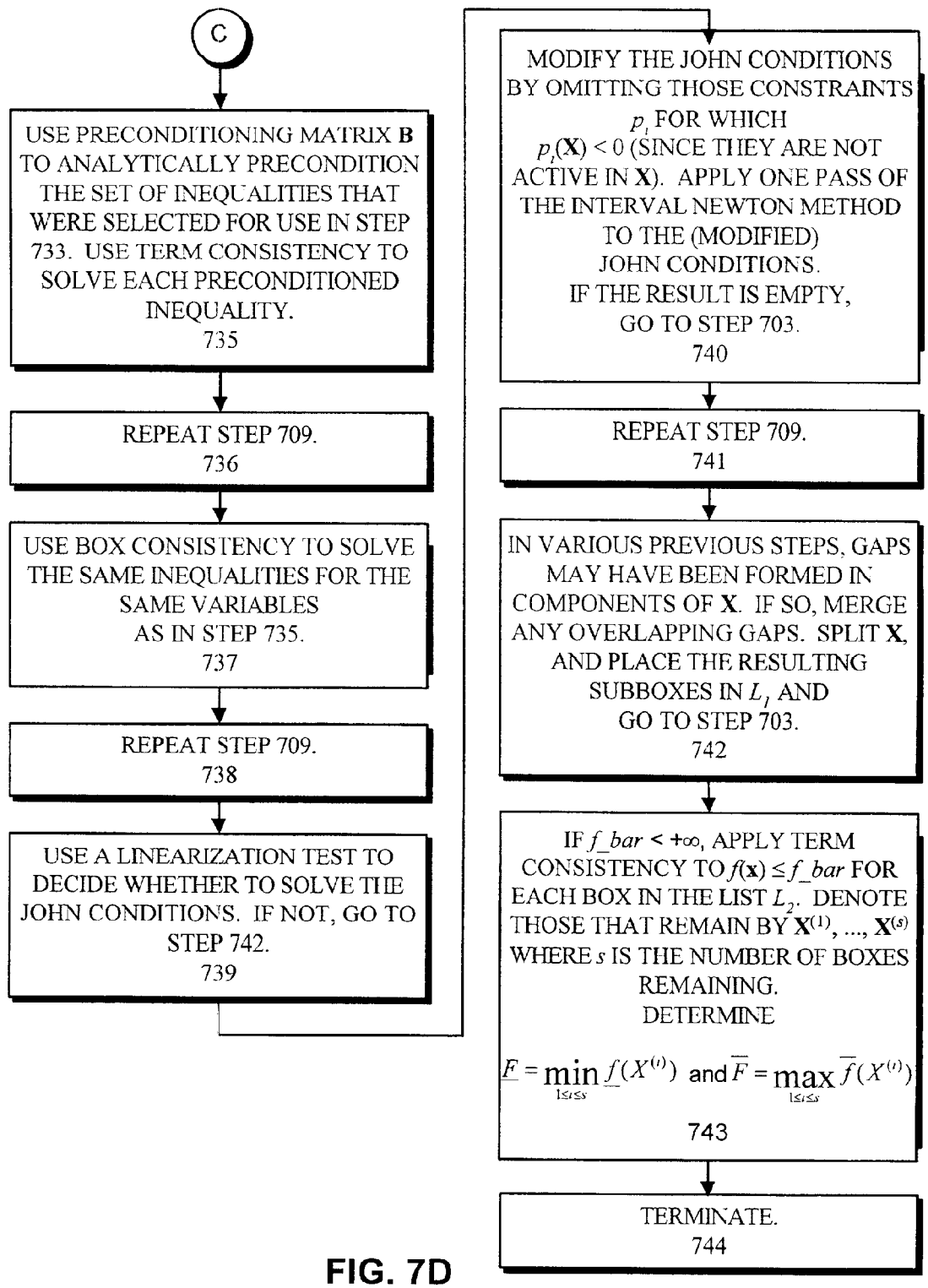
FIG. 7D presents a fourth portion of a flow chart illustrating the process of using term consistency to solve an interval global optimization problem with inequality constraints in accordance with an embodiment of the present invention.

Step 733 in the flow chart in FIG. 7C mentions subprocedure for solving a linearized system of inequalities. We now describe this sub-procedure in more detail.

Systems Of Inequalities

Inequality constrained optimization problems generally have more than one inequality constraint. Each can be separately used to reduce the box X. However, combinations of the inequalities are generally more successful in reducing X. In this section, we describe how inequalities can be combined.

To solve a system of linear equations, we can precondition the system and solve the preconditioned system using Gaussian elimination, the Gauss-Seidel method, or the hull method. We use a similar approach to solve linear systems of inequalities. In this case, the hull method is not applicable. We presently describe a procedure for inequalities that is similar to the Gauss-Seidel method for solving linear equalities.

It is convenient to say we "solve" a system of inequalities. However, this merely means that we apply a procedure that eliminates some certainly infeasible subboxes from a given box. We do not necessarily produce the smallest possible "solution" subbox.

The procedure has a certain similarity to the Fourier-Motzkin method described in, Dantzig, G. and Eaves, B. C. (1975), "Fourier-Motzkin Elimination and its Dual with Applications to Integer Programming", Combinatorial Programming: Methods and Application, Proceedings of the NATO Advanced Study Institute, B. Roy (ed.) Reidel, Dordrecht, Netherlands. In the Fourier-Motzkin method, the number of generated inequalities increases and can become quite large. In the following procedure, we also generate more inequalities than occur in the original system. However, the number of generated inequalities to be solved is always less than twice the number of inequalities we begin with.

Because we restrict the number of inequalities than can be generated, we delete fewer infeasible points from a box than is possible with greater effort. However, there is good reason for not expending too much effort. In practice, one or more of the inequalities in a given optimization problem is generally nonlinear. We linearize them in order to compute a solution. The coefficients in the linear expansion are functions of the box in which we are solving the system of inequalities. Therefore, the inequalities change as the box is reduced. There is little point in getting the very best solution to a linear system that is not the final one to be solved.

Once we have linearized the inequalities, we have a system of the form $A^I x \leq b^I$, where $A^I$ is an interval matrix. It has as many rows (say m) as there are inequalities. It has n columns where n is the number of variables. The interval vector $b^I$ has m components.

If we multiply an inequality by a positive constant, we do not change the sense of the inequality. Also, we can add two inequalities together if they have the same sense. Hence, a positive linear combination of inequalities (having the same sense) yields another valid inequality. Therefore, we can perform Gaussian elimination on the set of inequalities provided we use positive multipliers. To eliminate a given element in the coefficient matrix, the given element and the pivot element must have opposite sign.

Note that to solve a set of linear equations by interval Gaussian elimination, we can first multiply by an approximate inverse of the center of the coefficient matrix. This step reduces the growth of interval widths in the elimination process.

We use a similar procedure for systems of inequalities. It is somewhat more complicated, however. The purpose in both procedures is to reduce the effect of dependence.

Let $A^c$ denote the center, $m(A^I)$, of $A^I$. Using $A^c$, we generate a real matrix B of nonnegative elements such that the modified system $BA^I x \leq Bb^I$ can be solved with reduced interval width. Thus, B is a preconditioning matrix similar to that used when solving linear interval equations. Now, however, the number of rows of B may be any number from m to 2m−1 depending on the problem.

The matrix B can be computed in the same way a matrix inverse is generated. To aid in understanding, we now describe this more familiar procedure.

Let Q be a square, nonsingular, real matrix. Initially, set B equal to the identity matrix I. Use (for example) the Gauss-Jordan method of elimination to transform Q into the identity matrix. Simultaneously, do every arithmetic operation on B that is done in the elimination process on Q. When Q is finally transformed to I, the same operations on B produce the inverse of Q.

Suppose Q is an m by n matrix and $m \neq n$. If $m \geq n$, the elimination procedure can zero elements in position (i,j) for all i and j with $i \neq j$. If m<n, then zeros are produced only in the first m columns.

Now consider the case m=n so that the system of interval equations $Q^I x = c^I$ is square. Let $Q^c$ be the center $m(Q^I)$ of $Q^I$. Let B be an approximate inverse of $Q^c$. We can compute B as just described. Multiplying $Q^I x = c^I$ by B, we obtain $BQ^I x = Bc^I$. In this new equation, the coefficient matrix tends to be diagonally dominant and can be solved without undue growth (from dependence) of interval widths.

When solving inequalities, we use a similar procedure. We generate a preconditioning matrix B in essentially the same way. However, in the case of inequalities, the elements of B must now be nonnegative. This restriction may prevent completion of the elimination process to get the desired B. However, this does not mean the process fails. It merely means we delete fewer points from a box.

Having computed B, we multiply $A^I x \leq b^I$ by B, getting $BA^I x \leq Bb^I$. We can solve this relation with less growth of interval widths than for the original relation $A^I x \leq b^I$.

In general, we do column interchanges to compute B. Therefore, instead of $BA'x \leq Bb'$, our new system is $(BA'P)(Px) \leq Bb'$ where P is a permutation matrix and $BA'P$ is the new coefficient matrix.

The order in which the inequalities are combined by the elimination process is important. We discuss this aspect in the next section and then return to the solution process in the following section.

Ordering Inequalities

Consider a set of inequalities $p_i(x) \leq 0 (i=1, \ldots, m)$. If we evaluate $p_i$ for some $i=1, \ldots, m$ over a box X, we compute an interval $p_i(X) = [\inf(p_i(X)), \sup(p_i(X))]$. If $\sup(p_i(X)) \leq 0$, then $p_i(x) \leq 0$ for all $x \in X$, and this particular constraint cannot cause a point in X to be infeasible. Therefore, this constraint can be ignored when considering the box X.

If $\inf(p_i(X)) > 0$, then $p_i(x) > 0$ for all $x \in X$. That is, every point $x \in X$ is certainly infeasible. For these extreme cases, the effect of the particular inequality is known. The case of interest is when $\inf(p_i(X)) \leq 0 < \sup(p_i(X))$.

Hereafter in this section, we assume this condition holds for all $i=1, \ldots, m$. We want to know which inequalities are more helpful in deleting certainly infeasible points of a given box X. The corresponding question in the non-internal case is: "Which constraints are most strongly violated at some point?" This question is complicated by the fact that the different inequalities may be scaled differently. In the interval case, we address this complication by (implicitly) normalizing.

Consider the quantity $s_i = \sup(p_i(X))/[\sup(p_i(X)) - \inf(p_i(X))]$ for $i=1, \ldots, m$. If $\sup(p_i(X)) = 0$, then $s_i = 0$ and (as pointed out above) the constraint $p_i(x) \leq 0$ is of no help in eliminating certainly infeasible point from X.

If $\inf(p_i(X)) = 0$ and $\sup(p_i(X)) > 0$, then $s_i = 1$ and X cannot contain interior points of the feasible region. That is, the constraint is about as useful as possible in eliminating certainly infeasible points of X. For constraints of interest, $0 < s_i \leq 1$; and the larger $s_i$, the greater help the constraint tends to be in eliminating points of X.

Assume $\inf(p_i(X)) \leq 0 < \sup(p_i(X))$ holds for a set of m constraints. We order them so that $s_i > s_{i+1}$ for all $i=1, \ldots, m-1$. Then the smaller the index i, the more useful the constraint tends to be. We proceed as follows. We first evaluate $p_i(X)$ for all $i=1, \ldots, m$. If $\inf(p_i(X)) > 0$ for some i, our process for solving the constraint inequalities is finished. There is no feasible point in X. If $\sup(p_i(X)) \leq 0$, then (while X is the current box) we drop the i-th constraint from the list of constraints to be solved. We linearize those that remain.

Assume X is not certainly infeasible and that all constraints for which $\sup(p_i(X)) \leq 0$ (i.e., that are known to be inactive in X) have been removed from the list. We order the remaining constraints according to the value of $s_i$ as described above.

Secondary Pivots

We now return attention to the elimination process. Consider the step in which we generate the preconditioning matrix B occurring in $BA'x \leq Bb'$. We compute B by operating on $A^c = m(A^I)$. Consider a typical stage of the elimination process in which we have transformed $A^c$ into an intermediate form which we denote by A. Assume A has zero elements in positions $(i,j)$ for all $i > j$ and $j=1, \ldots, r-1$ for some $r=1, \ldots, n-1$.

We wish to use elimination to transform A into a new matrix A' having zeros in positions $(i,r)$ for $i=r+1, \ldots, m$. If $a_{rr} > 0$, we can use $a_{rr}$ as a pivot to produce zeros in column r wherever there is a negative element in these positions. Since each multiplier must be positive, we must use a negative pivot to produce zeros wherever positive elements occur (other than in position $(r,r)$) in column r. We call this negative (when $a_{rr} > 0$) pivot the secondary pivot. When $a_{rr} < 0$, the secondary pivot is positive.

Suppose $a_{rr} \neq 0$. As the secondary pivot, we use the element $a_{ir}$ with smallest index $i = r+1, \ldots, m$ such that $a_{ir}$ and $a_{rr}$ are of opposite sign. We use the secondary pivot to zero all elements in positions $(i,r)$ for $i=r+1, \ldots, m$ that are opposite in sign to it. We then use the primary pivot to zero all remaining elements in these positions, including the secondary pivot.

The operations that we perform on $A^c$ are performed stepwise. The same operations are later performed in one "composite" operation on $A^I$. See below. If $a_{rr} > 0$, we expect that row r of the transformed matrix can be used to compute an upper bound on feasible values of $x_r$ in X. Again, see below.

Similarly, using the row of $A^I$ corresponding to the row containing the (negative) secondary pivot, we expect to be able to compute a lower bound on feasible values of $x_r$ in X.

In doing our operations to compute the matrix B to transform $A'x \leq b^I$ into $BA'x \leq Bb^I$, we wish to save both the primary and secondary pivot rows. This enables us to get both lower and upper bounds on the variables. The primary pivot row is, of course, "saved" in doing the elimination process.

When transforming the matrix A into A' (as discussed above), we save the secondary pivot row by appending an additional row to A'.

Assume the inequalities have been placed in the order described in the previous section. Because this is a desirable order, we wish to not interchange rows of A even though interchanges for pivot selection might enhance numerical stability. However, we are free to interchange columns. In the next section, we discuss how to do so to get a "well positioned" secondary pivot and improve numerical stability.

Column Interchanges

We now describe a simple procedure for choosing a pivotal column in this section. We do not perform row interchanges unless the current row is zero. In decreasing order of importance, we want:

(1) the secondary pivot to occur as high in its column as possible;

(2) the secondary pivot to be as large in magnitude as possible; and (3) the primary pivot to be as large in magnitude as possible.

Consider what happens when we use a pivot element to eliminate an element in another row. We first "scale" the pivot row by multiplying it by the multiplier. Then we add the scaled pivot row to another row. If the multiplier is large in magnitude, the scaled pivot row tends to dominate and information in the other row is lost by being shifted off the accumulator in the addition step.

That is, information in the pivot row dominates and is saved while information in the other row is lost. Conversely, if the multiplier is small in magnitude, the information in the other row is retained. This is why we want a multiplier to be small in magnitude when doing ordinary Gaussian elimination. That, in turn, is why we want the pivot elements to be large in magnitude.

In our case, if we have to use a pivot element small in magnitude, we want the pivot row to contain highly useful information. Thus, we want the dominating pivot row to correspond to an inequality that is "strongly violated" in X.

Because of the way in which the rows were initially ordered, higher rows are more useful in this sense than lower rows. It is for this reason that we want the secondary pivot (which occurs lower than the primary pivot) to occur as high in the column as possible. The smaller the pivot, the more the pivot row dominates.

We wish to allow more useful information rather than less useful information to dominate in this way. Thus, it is more important for the secondary pivot to be large in magnitude than it is for the primary pivot to be large in magnitude.

It may seem odd that we are willing to sacrifice numerical stability (i.e., accuracy) in favor of maintaining the order of the inequalities. The reason is that much of the time we solve the inequalities over a relatively large box. Therefore, the linearization of the original nonlinear inequalities does not produce very accurate approximation.

Moreover, we are satisfied merely deleting large infeasible portions of such boxes. Accuracy is of little importance until the boxes become small near the end of the optimization process. Therefore, we opt for efficiency over accuracy in this part of the process.

In the next section, we describe our algorithm for computing the preconditioning matrix B discussed in previous sections. The above arguments are used in choosing the columns to interchange for the pivot selection and elimination procedure.

The Preconditioning Matrix

This section describes a procedure for doing Gaussian elimination to transform $A^c$ into a matrix with the desired zero elements. This procedure also saves the secondary pivot rows. The preconditioning matrix B is computed by performing the same operations on a matrix that begins as the identity matrix of order m.

Figure 8A:
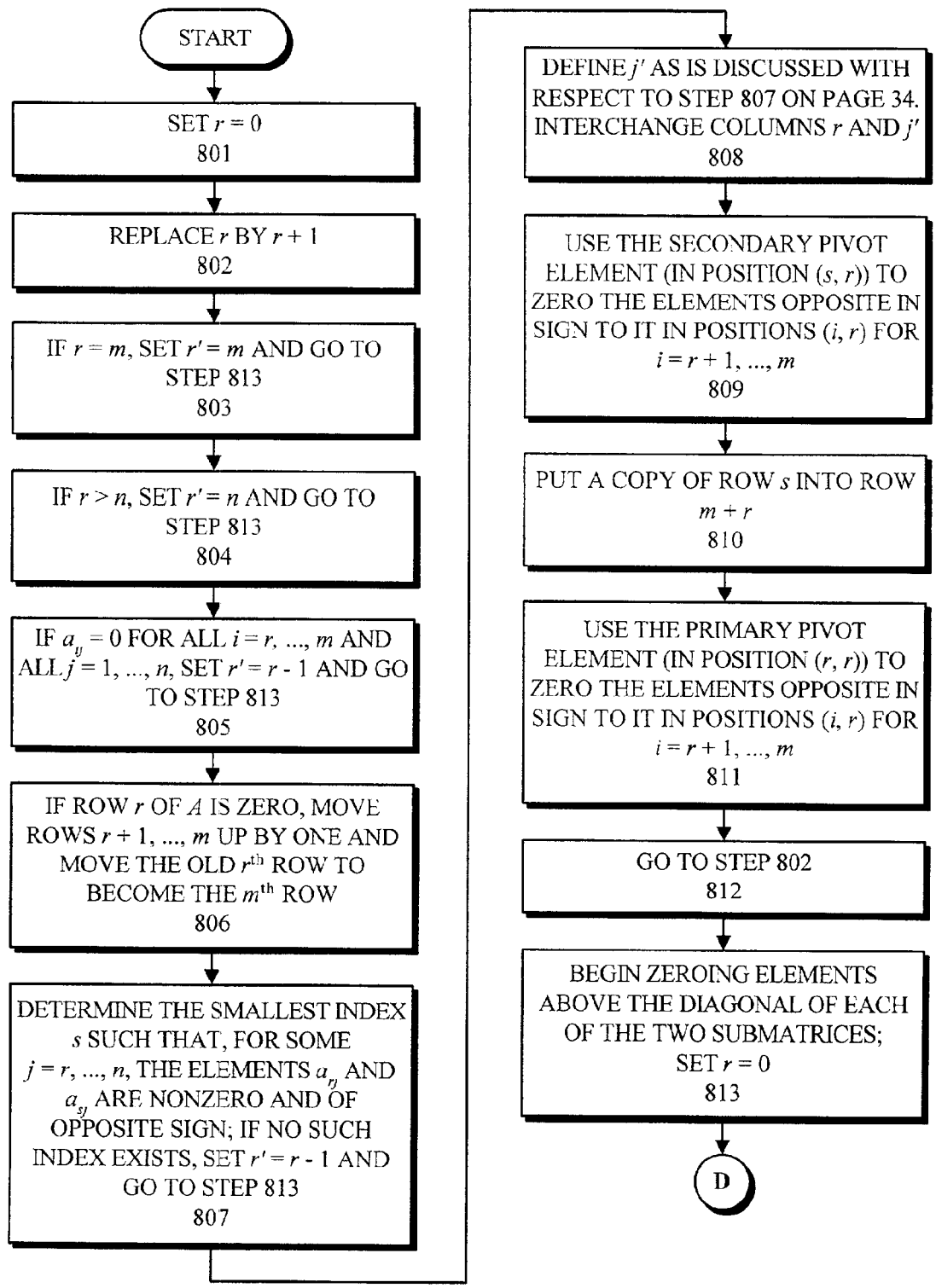
FIG. 8A presents a first portion of a flow chart illustrating the process of solving a system of linear inequality constraints in accordance with an embodiment of the present invention.
Figure 8B:
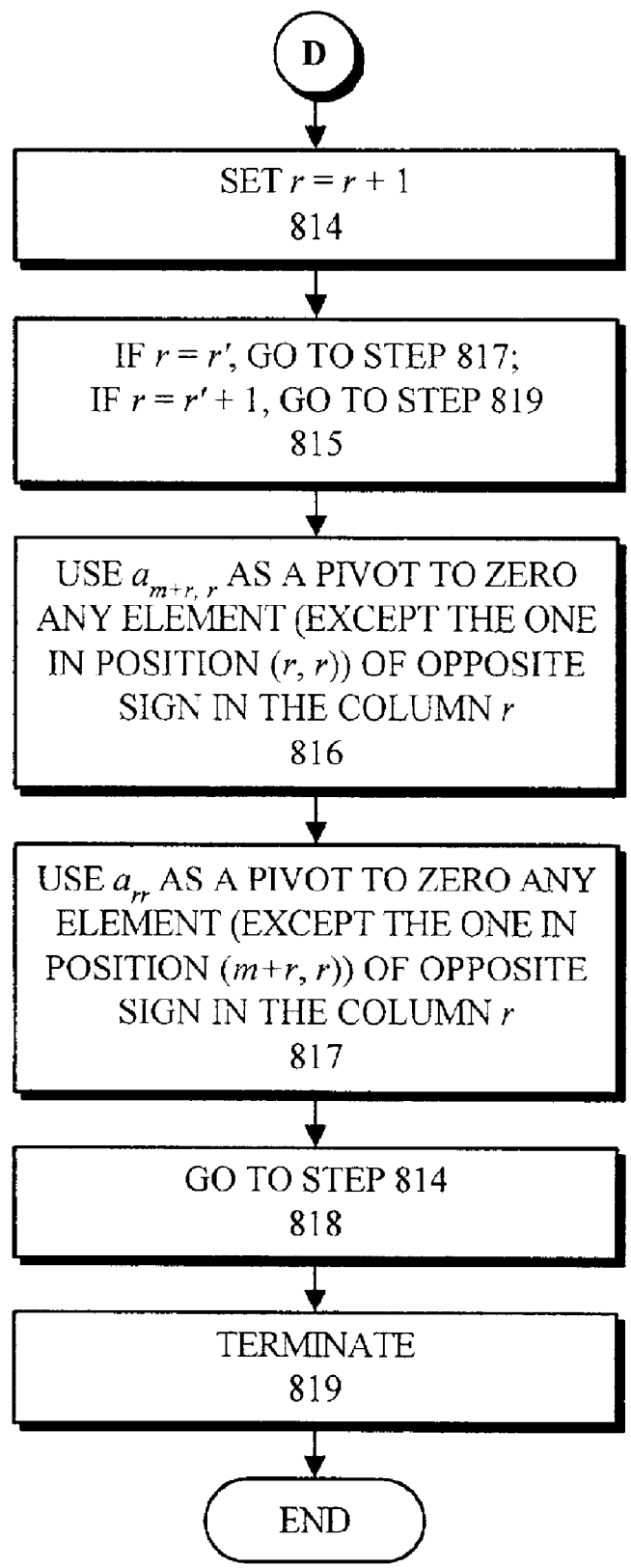
FIG. 8B presents a second portion of a flow chart illustrating the process of solving a system of linear inequality constraints in accordance with an embodiment of the present invention.

We let A denote the matrix being transformed. Initially, $A=A^c$. We retain the same name for the matrix throughout the elimination process even though it changes with each step. The system performs the following operations that are illustrated in the flow chart that appears in FIG. 8.

The system first sets r=0 (step 801). Next, the system replaces r by r+1 (step 802).

If r=m, the system sets r'=m and goes to step 813 (step 803).

If r>n, the system sets r'=n and goes to step 813 (step 804).

If $a_{ij}=0$ for all i=r, . . . , m and all j=1, . . . , n, the system sets r'=r−1 and goes to step 813 (step 805).

If row r of A is zero, the system moves rows r+1, . . . , m up by one and moves the old r-th row to become the m-th row (step 806).

Next, the system determines the smallest index s such that, for some j=r, . . . , n, the elements $a_{rj}$ and $a_{sj}$ are nonzero and of opposite sign. If no such index exists, the system sets r'=r−1 and goes to step 813. Suppose $a_{rj}$ and $a_{sj}$ are of opposite sign for all j in some set J of indices r, . . . , n. Let j' denote the index j∈J for which $a_{sj}$ is largest in magnitude. If there is more than one such index, choose j' to be the index for which $a_{rj}$ (with j∈J) is largest in magnitude (step 807).

Next, the system interchanges columns r and j' (step 808).

The system then uses the secondary pivot element (in position (s,r)) to zero the elements opposite in sign to it in positions (i,r) for i=r+1, . . . , m (step 809).

Next, the system puts a copy of row s into row m+r (step 810).

The system then uses the primary pivot element (in position (r,r)) to zero the elements opposite in sign to it in positions (i,r) for i=r+1, . . . , m (step 811).

Next, the system goes to step 802 (step 812).

At this point, the first m rows of A are now in upper trapezoidal form. A sub-matrix of r'−1 rows and n columns has been appended to A. This sub-matrix is composed of secondary pivot rows and is also in upper trapezoidal form. The system begins zeroing elements above the diagonal of each of the two sub-matrices and sets r=0 (see discussion of the partitioned matrix M in the following section) (step 813).

Next, the system sets r=r+1 (step 814).

If r=r', the system goes to step 817, and if r=r'+1, the system goes to step 819 (step 815).

Next, the system uses $a_{m+r,r}$ as a pivot to zero any element (except the one in position (r,r)) of opposite sign in column r (step 816).

The system then uses $a_{rr}$ as a pivot to zero any element (except the one in position (m+r,r)) of opposite sign in column r (step 817)

Next, the system goes to step 814 (step 818).

The system then terminates (step 819).

Solving Inequalities

In this section, we discuss how to "solve" inequalities with interval coefficients after they have been preconditioned. Assume we have computed the preconditioning matrix B as described in the previous section. Recall that, while performing the matrix operations given by the steps of the algorithm, we compute B by doing the same operations on a matrix that is initially the identity matrix of order m.

Recall that we wish to "solve" a set of linear inequalities $A^I x \leq b^I$. We precondition these inequalities by transforming them into $(BA^I P)(Px) \leq Bb^I$ where P is the permutation matrix effecting the column interchanges described in the previous section.

To simplify the following discussion, we assume no column interchanges were necessary. In this case, $(BA^I P)(Px) \leq Bb^I$ takes the simpler form $BA^I x \leq c^I$, where $c^I = Bb^I$.

The preconditioning matrix B transforms $A^c$ into a matrix $M = BA^c$ with as many zero elements as can generally be obtained using elimination with positive multipliers. We can partition M in the form $$M = \begin{bmatrix} M_{11} & M_{12} \\ M_{21} & M_{22} \\ M_{31} & M_{32} \end{bmatrix}.$$

Sub-matrix $M_{11}$ is a square diagonal matrix of r' rows and columns where r' was determined in the previous section. Sub-matrix $M_{21}$ is a zero matrix of m−r' rows and r' columns. It is absent if r'≧m. Sub-matrix $M_{31}$ is a square diagonal matrix of r' rows and columns. Sub-matrix $M_{22}$ has m−r' rows and n−r' columns. Its elements are all of one sign or are zero. It is absent if r'≧m or if r'=n. Sub-matrices $M_{12}$ and $M_{32}$ are conformal in size and consist of elements that may be positive, negative, or zero. They are absent if r'=n.

In practice, we generally have m<n and, hence, sub-matrices $M_{12}$ and $M_{32}$ are present. Sub-matrices $M_{21}$ and $M_{21}$ may or may not be present.

We now solve the preconditioned inequalities. Because there are r' inequalities added (corresponding to the secondary pivot rows), we solve m+r' preconditioned inequalities. However, we do not solve a given inequality for every variable. The preconditioning matrix B, was chosen so that certain elements of $BA^c$ were zero. Suppose an element in position (i,j) of $BA^c$ is one of these elements. Then we do solve the i-th preconditioned inequality for the j-th variable. In the ideal case, we solve each inequality for only one variable.

Suppose that when we solve for a given variable, its coefficient is an interval containing zero. In this case, the result (after intersection with X) may be the union of two intervals with a gap removed. We save the information about the gap for later use. Otherwise, we ignore it when solving for other variables. It is reasonable to simply omit solving for the given variable when its coefficient contains zero.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. For example, although the present invention describes the use of derivatives in certain situations, it is often possible to use slopes instead of derivatives.

Additionally, the above disclosure is not intended to limit the present invention. The scope of the present invention is defined by the appended claims.

What is claimed is:

1. A computer-readable storage medium storing instructions that when executed by a computer cause the computer to perform a method for solving a system of linear inequalities, the method comprising:

receiving a representation of the system of linear inequalities $Ax \leq b$, wherein A is a matrix with m rows corresponding to m inequalities, and with n columns corresponding to n variables, wherein x includes n variable components, and wherein b includes m scalar components;

storing the representation in a memory within a computer system;

solving the system of linear inequalities $Ax \leq b$ by performing a Gaussian elimination process using only positive multipliers so as not to change the sense of any inequaltiy;

wherein for a given column j in the matrix A, performing Gaussian elimination process involves, if possible, selecting a primary pivot row r including a primary pivot element, $a_{rj}$, which is nonzero, selecting a secondary pivot row s including a secondary pivot element, $a_{sj}$, which is nonzero and opposite in sign to $a_{rj}$, using the secondary pivot element $a_{sj}$ to zero elements opposite in sign to it in the same column of A, except for the primary pivot element $a_{rj}$, adding a copy s' of the secondary pivot row s to the matrix A, thereby increasing the number of rows in the matrix A, and using the primary pivot element $a_{rj}$ to zero elements opposite in sign to it in the same column of A, except for the copy of the secondary pivot element $a_{sj}$ in row s'.

2. The computer-readable storage medium of claim 1, wherein receiving the representation of the system of linear inequalities $Ax \leq b$ involves:

receiving a system of linear inequalities with interval coefficients $A^I x \leq b^I$; and forming an initil matrix A as the center of the interval matrix $A^I$.

3. The computer-readable storage medium of claim 2, wherein the method further comprises generating a preconditioning matrix B by;

starting with an initial identity matrix B of order m; and performing the same operations on B as are performed on the matrix A during the Gaussian elimination process.

4. The computer-readable storage medium of claim 3, wherein the method further comprises using the preconditioning matrix B to precondition the system of linear inequalities $A^I x \leq b^I$ to generate a modified system $BA^I x \leq Bb^I$ that can be solved with reduced interval width.

5. The computer-readable storage medium of claim 2, wherein receiving the system of linear inequalities with interval coeffrcients $A^I x \leq b^I$ involves linearizing an initial system of nonlinear inequalities to form the system of linear inequalities with interval coefficients $A^I x \leq b^I$.

6. The computer-readable storage medium of claim 1, wherein performing the Gaussian elimination process involves performing column interchanges in the system of linear equalities $Ax \leq b$.

7. The computer-readable storage medium of claim 1, wherein selecting the secondary pivot row s involves ensuring that the secondary pivot element $a_{sj}$ is as high as possible in its column.

8. The computer-readable storage medium of claim 1, wherein selecting the secondary pivot row s involves ensuring that the secondary pivot element $a_{sj}$ is as large in magnitude as possible.

9. The computer-readable storage medium of claim 1, wherein selecting the primary pivot row r involves ensuring that the primary pivot element $a_{rj}$ is as large in magnitude as posssible.

* * * * *

UNITED STATES PATENT AND TRADEMARK OFFICE
CERTIFICATE OF CORRECTION

PATENT NO. : 6,950,844 B2
DATED : September 27, 2005
INVENTOR(S) : G. William Walster and Eldon R. Hansen It is certified that error appears in the above-identified patent and that said Letters Patent is hereby corrected as shown below:

Column 19,
Line 31, please delete the word "inequaltiy" and replace with the word -- inequality --.

Column 20,
Line 10, please delete the word "initil" and replace with the word -- initial --.
Line 24, please delete the word "coeffrcients" and replace with the word -- coefficients --.
Line 43, please delete the word "posssible" and replace with the word -- possible --.

Signed and Sealed this

Twenty-ninth Day of November, 2005

JON W. DUDAS
*Director of the United States Patent and Trademark Office*